United States Patent
Bertolotto et al.

(10) Patent No.: US 8,813,592 B2
(45) Date of Patent: Aug. 26, 2014

(54) TWO-GEAR TRANSMISSIONS FOR ELECTRIC MACHINES WITH SYSTEMS FOR CONTROLLING ANGULAR PLAY

(71) Applicant: Oerlikon Graziano S.p.A., Rivoli (IT)

(72) Inventors: Stefano Bertolotto, Magliano Alfieri (IT); Giorgio Scalici, Casalbagliano (IT)

(73) Assignee: Oerlikon Graziano S.p.A., Rivoli (TO) (IT)

( * ) Notice: Subject to any disclaimer, the term of this patent is extended or adjusted under 35 U.S.C. 154(b) by 0 days.

(21) Appl. No.: 13/905,169

(22) Filed: May 30, 2013

(65) Prior Publication Data

US 2013/0319149 A1 Dec. 5, 2013

(30) Foreign Application Priority Data

Jun. 1, 2012 (IT) ................................ TO2012A0484

(51) Int. Cl.
*F16H 3/08* (2006.01)
*F16H 3/10* (2006.01)

(52) U.S. Cl.
CPC .. *F16H 3/08* (2013.01); *F16H 3/10* (2013.01); *F16H 2200/0034* (2013.01); *F16H 2200/0021* (2013.01)
USPC .................. 74/325; 74/329; 74/333

(58) Field of Classification Search
USPC .......................................... 74/325, 329, 333
See application file for complete search history.

(56) References Cited

U.S. PATENT DOCUMENTS

| 2,009,133 | A | * | 7/1935 | Gerst | 74/369 |
| 2,021,165 | A | | 11/1935 | Barton | |
| 4,280,583 | A | * | 7/1981 | Stieg | 180/250 |
| 4,565,106 | A | * | 1/1986 | Sumiyoshi | 74/359 |
| 4,579,015 | A | * | 4/1986 | Fukui | 74/329 |
| 5,341,698 | A | | 8/1994 | Tseng | |
| 6,752,033 | B2 | * | 6/2004 | Rankin | 74/329 |

FOREIGN PATENT DOCUMENTS

EP    2305501 A1    4/2011

\* cited by examiner

*Primary Examiner* — Ha D. Ho
(74) *Attorney, Agent, or Firm* — Robert E. Alderson, Jr.

(57) ABSTRACT

Two-gear transmissions for electric machines are provided, which include a primary shaft; a secondary shaft; a first gear set which includes a first driving gearwheel and a first driven gearwheel, one of these gearwheels including a first hub and a ring gear; a second gear set which includes a second driving gearwheel and a second driven gearwheel; an overrunning clutch interposed between the ring gear and the first hub; a first coupling device arranged to connect the ring gear for rotation directly with the respective shaft and comprises a second hub and a sliding sleeve; a second coupling device arranged to connect either the second driving gearwheel or the second driven gearwheel for rotation with the respective shaft; connection elements connecting the first hub for rotation with the second hub; and elastic elements applying on the first and second hubs a biasing torque to urge them towards an end-of-travel position.

4 Claims, 3 Drawing Sheets

TWO-GEAR TRANSMISSIONS FOR ELECTRIC MACHINES WITH SYSTEMS FOR CONTROLLING ANGULAR PLAY

CROSS REFERENCE TO RELATED APPLICATION

This application claims priority to and benefit of Italian Patent Application No. TO2012A000484 filed Jun. 1, 2012, the contents of which are incorporated by reference in their entirety.

FIELD OF THE INVENTION

The present invention relates to a two-gear transmission coupled to an electric machine, particularly, although not necessarily, for use on electric vehicles.

BACKGROUND OF THE INVENTION

Electric vehicle transmissions having more than one gear have an advantage over one-gear transmissions in that they allow the electric machine to operate at an optimal number of revolution per minute, i.e. at the number of revolution per minute corresponding to the maximum efficiency of the machine, in a wider range of vehicle speed. Such an advantage is achieved both in the traction operating mode, in which the electric machine operates as a motor to generate the power required to drive the vehicle, and in the regeneration operating mode, in which the electric machine operates as a generator to convert the kinetic energy of the vehicle, upon deceleration, into electric energy.

A two-gear transmission for electric machines is known from EP-A-2 305 501. According to this known solution, the transmission comprises a primary shaft, a secondary shaft, a gear set for a first gear, or low gear, which includes a first driving gearwheel carried by the primary shaft and a first driven gearwheel carried by the secondary shaft and permanently meshing with the first driving gearwheel, and a gear set for a second gear, or high gear, which includes a second driving gearwheel carried by the primary shaft and a second driven gearwheel carried by the secondary shaft and permanently meshing with the second driving gearwheel.

The first driven gearwheel (or, alternatively, the first driving gearwheel) includes a hub rigidly connected for rotation with the respective shaft and a ring gear mounted around the hub so as to be able to rotate relative to the hub, an overrunning clutch being interposed between the ring gear and the hub to allow the transmission of the torque through the gear set of first gear only in the direction from the primary shaft to the secondary shaft. The transmission further includes a first coupling device arranged to connect the gearwheel to which the overrunning clutch is associated for rotation directly with the secondary shaft, so as to allow the transmission of the torque through the gear set of first gear also in the direction from the secondary shaft to the primary shaft, and a second coupling device arranged to connect the second driving gearwheel or the second driven gearwheel for rotation with the respective shaft.

The first coupling device includes a hub, which is rigidly connected for rotation with the secondary shaft, and a sliding sleeve, which is provided with first engagement teeth arranged to mesh with second engagement teeth of the gearwheel to which the overrunning clutch is associated. The sliding sleeve of the first coupling device is connected for rotation with the respective hub and is axially slidable relative to the hub between a disengagement position, in which the first and second engagement teeth are disengaged from each other, and an engagement position, in which the first and second engagement teeth mesh with each other, thereby connecting the ring gear of the gearwheel to which the overrunning clutch is associated for rotation with the secondary shaft.

In order to ensure correct operation of this known transmission, and more specifically of the overrunning clutch, it is necessary to properly set the plays inside the overrunning clutch and between the engagement teeth of the sliding sleeve of the first coupling device and of the ring gear of the gearwheel to which the overrunning clutch is associated, and more specifically the plays inside the overrunning clutch must be less than the plays between the aforesaid engagement teeth. It may therefore happen that if those plays are not ensured, due to manufacturing tolerances and/or deformations, the transmission will not operate correctly.

SUMMARY OF THE INVENTION

It is therefore an object of the present invention to provide a two-gear transmission for electric machines of the above-specified type, which is not affected by the above-discussed drawback of the prior art.

This and other objects are fully achieved according to the present invention by virtue of a two-gear transmission for electric machines having the features described herein and in the accompanying figures and claims.

DETAILED DESCRIPTION

The term "electric vehicles" is used herein to refer to vehicles which use as prime mover one or more electric machines, which may be the sole source of traction power (in case of purely electric vehicles) or be associated to an internal combustion engine (in case of hybrid vehicles).

Figure 1:
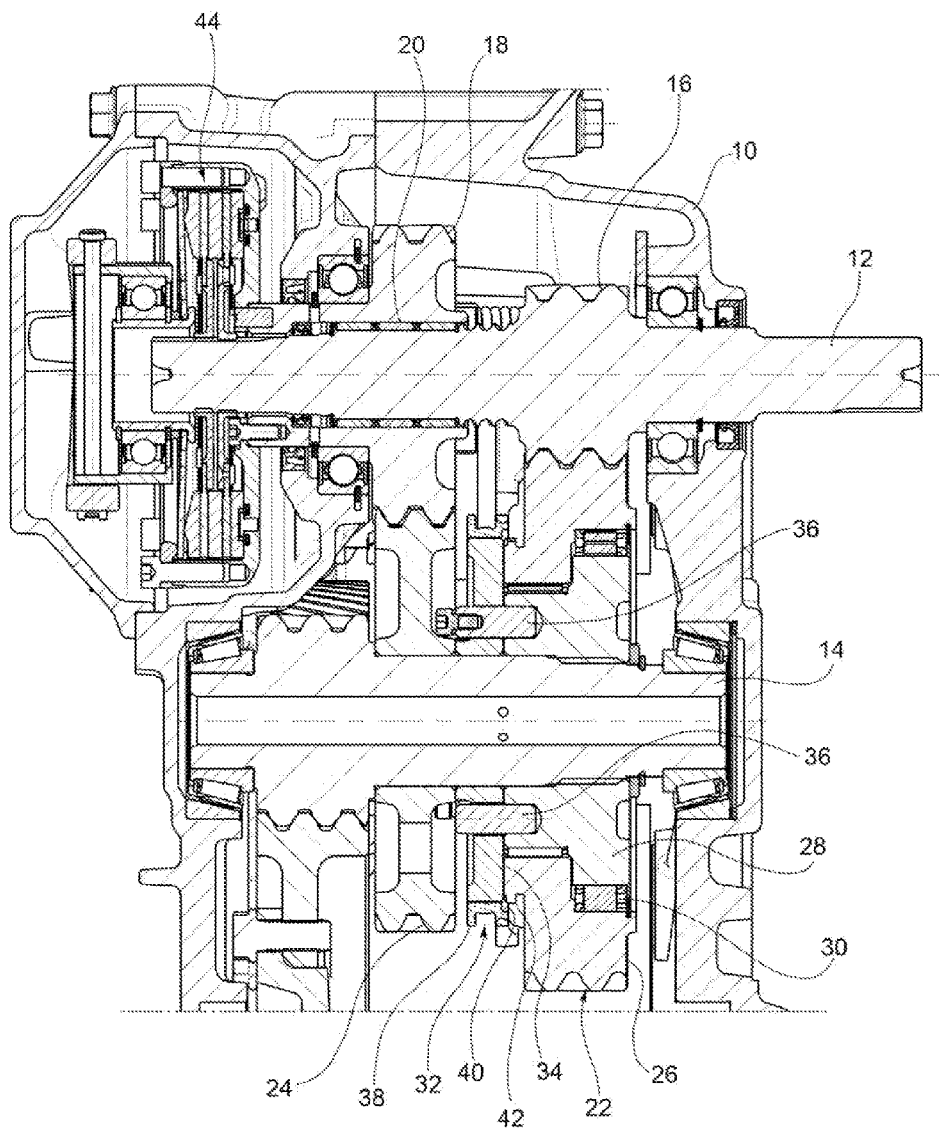
FIG. 1 is a section view of a two-gear transmission for electric machines according to embodiments of the present invention.

With reference first to FIG. 1, a two-gear transmission for electric machines according to embodiments of the present invention includes a casing or housing 10, a primary shaft 12 supported for rotation by the casing 10, and a secondary shaft 14 supported for rotation by the casing 10 and arranged parallel to the primary shaft 12.

The primary shaft 12 carries a first driving gearwheel 16 for a first gear (i.e. the low gear) and a second driving gearwheel 18 for a second gear (i.e. the high gear). In the illustrated embodiment, the first driving gearwheel 16 is fixed, i.e. rigidly connected for rotation with the respective shaft (primary shaft 12), and more specifically it is made in a single piece with the primary shaft 12, whereas the second driving gearwheel 18 is an idle gearwheel, i.e. it is free to rotate relative to the primary shaft 12, on which it may be supported for example by needle bearing(s) 20.

The secondary shaft 14 carries a first driven gearwheel 22 for the first gear and a second driven gearwheel 24 for the second gear. The first driven gearwheel 22 may include an idle ring gear 26 permanently meshing with the first driving gearwheel 16, a hub 28 rigidly connected for rotation with the secondary shaft 14 (in certain embodiments, the hub 28 may be made as a separate piece from the secondary shaft 14 and may be coupled to it by splined coupling) and an overrunning clutch (also known as a freewheel) 30 interposed between the ring gear 26 and the hub 28 of the first driven gearwheel 22 and arranged to couple these two components of the first driven gearwheel for rotation with each other when the primary shaft 12 transmits torque to the secondary shaft 14 (traction phase) and until the rotational speed of the secondary shaft 14 (and hence of the hub 28) is less than or equal to the rotational speed of the primary shaft 12 divided by the transmission ratio of the first gear. The first driven gearwheel 22, or the related ring gear 26 may be an "idle" gearwheel to mean that this ring gear is not rigidly connected for rotation with the respective shaft (secondary shaft 14), contrary to the other gearwheel 16 of the gear set of the first gear, but in certain operating conditions (those in which the overrunning clutch 30 disconnects the ring gear 26 from rotation with the hub 28) is free to rotate relative to the shaft 14. In certain embodiments, the second driven gearwheel 24 may be made as a fixed gearwheel, i.e. it is rigidly connected for rotation with the secondary shaft 14, and permanently meshes with the second driving gearwheel 18.

The transmission may further comprise a first coupling device 32 arranged to couple the ring gear 26 of the first driven gearwheel 22 for rotation with the secondary shaft 14. The first coupling device 32 may be made either as a normally-engaged coupling device, in which case it keeps the ring gear 26 of the first driven gearwheel 22 connected for rotation, in rest conditions, with the secondary shaft 14, or as a normally-disengaged coupling device, in which case it leaves the ring gear 26 of the first driven gearwheel 22 free to rotate, in rest conditions, relative to the secondary shaft 14. The first coupling device 32 may comprise a hub 34, which may be mounted on the secondary shaft 14 so as to be free to rotate relative to it and may be connected for rotation with the hub 28 of the first driven gearwheel 22 by a plurality of connecting pins 36, and a sliding sleeve 38, which may be connected to the hub 34 by a splined profile so as to be rigidly connected for rotation with the hub, but is free to translate axially with respect to the hub. In certain embodiments at the end facing towards the first driven gearwheel 22, the splined profile of the sliding sleeve 38 forms first engagement teeth 40 arranged to mesh with second engagement teeth 42 formed by the ring gear 26 of the first driven gearwheel 22. The sliding sleeve 38 is movable between a disengagement position, in which the engagement teeth 40 and 42 are disengaged, and an engagement position, in which the engagement teeth 40 and 42 mesh with each other, whereby the ring gear 26 of the first driven gearwheel 22 is connected for rotation with the secondary shaft 14.

The transmission further may include a second coupling device 44, which in the illustrated embodiment is made as a friction clutch, associated with the second driving gearwheel 18. In the illustrated embodiment, the second coupling device 44 is of the normally-engaged type, and therefore in rest conditions it keeps the second driving gearwheel 18 connected for rotation with the primary shaft 12, whereas when it is actuated (for instance mechanically, hydraulically or electrically) it disconnects the second driving gearwheel 18 from rotation with the primary shaft 12. However, the second coupling device 44 might also be of the normally-disengaged type. In the illustrated embodiment, the second coupling device 44 is a dry multi-disc friction clutch, but of course it might also be a friction clutch of a different type, for example, a wet single-disc or multi-disc friction clutch.

Figure 2:
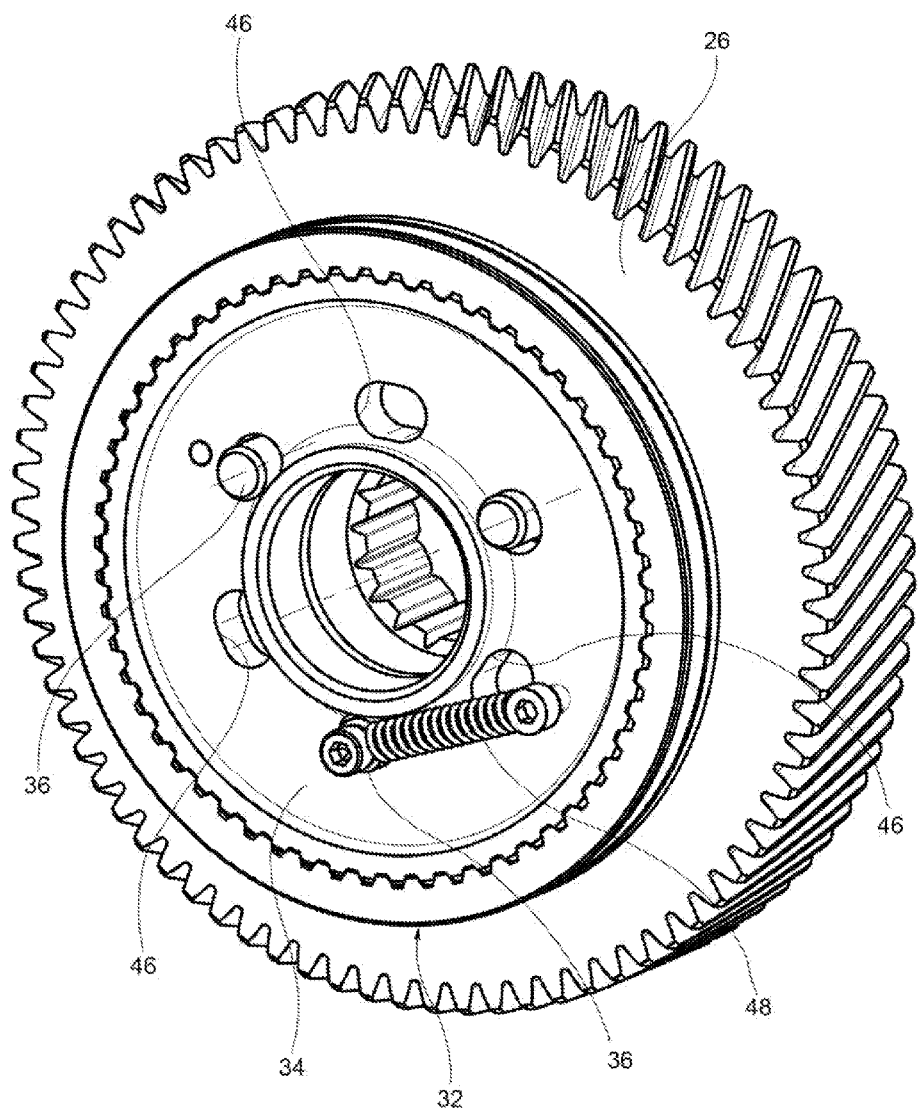
FIG. 2 is a perspective view of the assembly formed by the first driven gearwheel and by the first coupling device of the transmission of FIG. 1.
Figure 3:
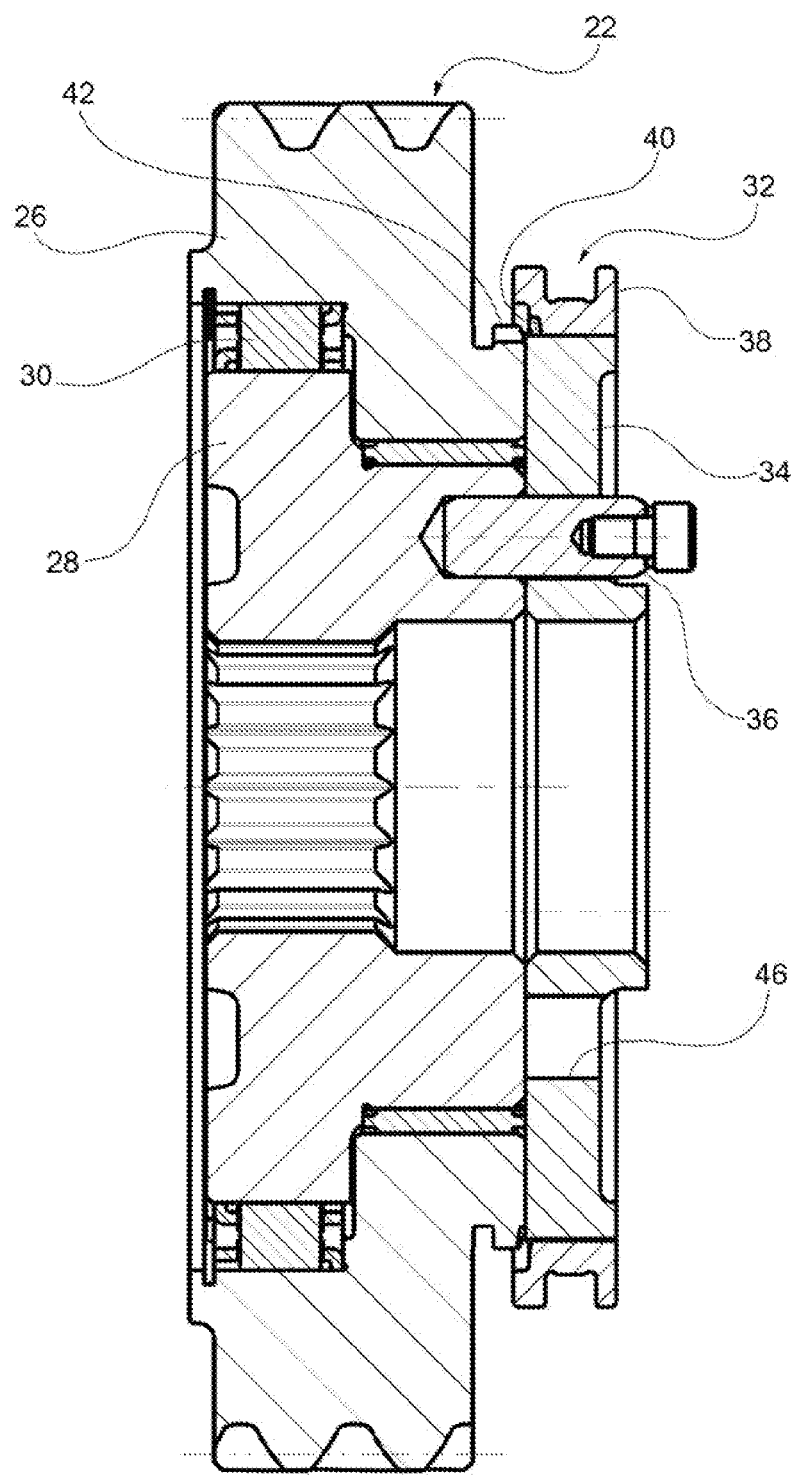
FIG. 3 is a section view of the assembly of FIG. 2.

With reference now in particular to FIGS. 2 and 3, a certain angular play may be provided between the hub 28 of the first driven gearwheel 22 and the hub 34 of the first coupling device 32, in that the hubs 28 and 34 may rotate relative to each other by a certain angle about the axis of the secondary shaft 14, and in this connection the transmission is provided according to the embodiments of the invention with an angular play control system for controlling the angular play between these two components of the transmission. More specifically, the connecting pins 36 may be fixed to the hub 28 of the first driven gearwheel 22 and each of them engages with play in a respective slot 46 provided in the hub 34 of the first coupling device 32 so as to allow the two hubs 28 and 34 to rotate relative to each other. In this connection, the connecting pins 36 may be arranged with the respective axes along a same circumference having its centre on the axis of the secondary shaft 14 and the axis of each slot 46 may be a curvilinear axis coinciding with a portion of that circumference. Moreover, both the connecting pins 36 and the slots 46 may be angularly evenly spaced from each other, the angular pitch of the slots 46 being an integer multiple (in the illustrated example, equal to 2) of the angular pitch of the connecting pins 36. In this way, the hub 28 and the hub 34 can rotate relative to each other between two end-of-travel positions defined by the connecting pins 36 abutting against the opposite ends of the slots 46. Elastic means also may be provided between the hub 28 and the hub 34 and are arranged to apply on these two components a biasing torque tending to urge them towards one of these end-of-travel positions. In this way, when the hub 34 does not transmit torque to the hub 28, these elastic means are able to keep the two hubs in the aforesaid end-of-travel position, and hence in a well defined relative position. According to the illustrated embodiment, these elastic means may comprise a spring 48 connected on the one hand to one of the connecting pins 36, and hence to the hub 28, and on the other hand to the hub 34. In the illustrated embodiment, the spring 48 is made as a cylindrical helical spring, but might also be made, for instance, as a spiral spring.

The operation of the above-described two-gear transmission will be described now, with reference in particular to the use of the transmission on an electrical vehicle.

With the second coupling device 44 kept disengaged, when the electric motor starts to rotate, the driving torque is transmitted from the primary shaft 12 to the secondary shaft 14 via the first driving gearwheel 16 and the first driven gearwheel 22 forming the gear set of first gear, the ring gear 26 of the first driven gearwheel 22 being connected for rotation with the hub 28, and hence with the secondary shaft 14, by the overrunning clutch 30. In certain embodiments, as soon as the vehicle starts to move forward, the first coupling device 32 is engaged (in case of a normally-disengaged device) or left engaged (in case of a normally-engaged device) to couple the ring gear 26 of the first driven gearwheel 22 for rotation with the secondary shaft 14. In this way, even though the torque is still transmitted from the primary shaft 12 to the secondary shaft 14 through the overrunning clutch 30, by virtue of the plays inside the overrunning clutch 30 being suitably chosen so as to be smaller than the plays between the engagement teeth 40 and 42 of the sliding sleeve 38 and of the ring gear 26, the sliding sleeve 38 is already in the engagement position and therefore the transmission is immediately able to operate also in regeneration mode with the first gear engaged. In fact, when braking, decelerating or downhill driving, the torque is transmitted from the driving wheels to the electric machine passing through the secondary shaft 14, the hub 34 and the sliding sleeve 38 of the first coupling device 32, the ring gear 26, the first driving gearwheel 16 and the primary shaft 12, the electric machine operating therefore as a generator for charging the batteries of the vehicle. When running with the first gear engaged (i.e., in the illustrated embodiment, with the second coupling device 44 disengaged), both in traction mode and in regeneration mode the second driving gearwheel 18 rotates idly, as it is driven into rotation by the second driven gearwheel 24 with which it permanently meshes.

In order to allow shifting from the first gear to the second gear, the first coupling device 32 is disengaged, thereby disengaging the engagement teeth 40 of the sliding sleeve 38 from the engagement teeth 42 of the ring gear 26 and hence causing the torque to be transmitted from the primary shaft 12 to the secondary shaft 14 through the overrunning clutch 30. The second coupling device 44 is then brought back into the engaged condition, whereby the second driving gearwheel 18 is connected for rotation with the primary shaft 12. In this way, as soon as the rotational speed of the ring gear 26, which is determined by the transmission ratio of first gear, becomes lower than the rotational speed of the hub 28, i.e. of the secondary shaft 14, which depends on the transmission ratio of second gear, the overrunning clutch 30 is "overrun" and automatically shifts to the disengagement condition. The driving torque is thus transmitted from the primary shaft 12 to the secondary shaft 14 via the driving gearwheel 18 and the driven gearwheel 24 of the gear set of second gear. The use of the overrunning clutch 30 for transmitting the torque through the gear set of first gear, which clutch operates in parallel to the gear set of second gear when the second driving gearwheel 18 is coupled for rotation with the primary shaft 12 upon engagement of the second coupling device 44, makes it possible to shift from the first gear to the second gear with no interruption in the transmission of the torque, i.e. in the so-called "power-shift" mode. With the second gear engaged, the operation in regeneration mode is allowed by the driving gearwheel 18 and the driven gearwheel 24 of the gear set of second gear permanently meshing with each other.

Naturally, the principle of the invention remaining unchanged, certain details may vary from those described, illustrated and claimed herein, without thereby departing from the scope of the invention as defined in the attached claims.

For example, the transmission also may be configured with the driving gearwheel being the idle gearwheel of the gear set of first gear, in which case the overrunning clutch and the first coupling device, along with the relating play control system, will be associated with the first driving gearwheel, instead of the first driven gearwheel. Moreover, the transmission also may be configured with the driven gearwheel being the idle gearwheel of the gear set of second gear, in which case the second coupling device will act on the second driven gearwheel, instead of the second driving gearwheel.

The invention claimed is:

1. A two-gear transmission for electric machines comprising:
    a primary shaft;
    a secondary shaft;
    a gear set for a first gear, or low gear, comprising a first driving gearwheel carried by the primary shaft and a first driven gearwheel carried by the secondary shaft and permanently meshing with the first driving gearwheel, wherein one of said first driving gearwheel and first driven gearwheel comprises a first hub rigidly connected for rotation with the respective shaft and a ring gear mounted around the first hub so as to be able to rotate relative to the first hub;
    a gear set for a second gear, or high gear, comprising a second driving gearwheel carried by the primary shaft and a second driven gearwheel carried by the secondary shaft and permanently meshing with the second driving gearwheel;
    an overrunning clutch interposed between the ring gear and the first hub to allow the transmission of the torque through the gear set of first gear only in the direction from the primary shaft to the secondary shaft;
    a first coupling device arranged to connect the ring gear of said first driving gearwheel or first driven gearwheel for rotation directly with the respective shaft, so as to allow the transmission of the torque through the gear set of the first gear also in the direction from the secondary shaft to the primary shaft, wherein said first coupling device comprises a second hub and a sliding sleeve provided with first engagement teeth arranged to mesh with second engagement teeth of the ring gear of said first driving gearwheel or first driven gearwheel, the sliding sleeve being connected for rotation with the second hub and being axially slidable relative to the second hub between a disengagement position, in which said first and second engagement teeth are disengaged from each other, and an engagement position, in which said first and second engagement teeth mesh with each other;
    a second coupling device arranged to connect one of said second driving gearwheel and second driven gearwheel for rotation with the respective shaft;
    connection elements connecting said first hub for rotation with said second hub, thereby allowing said first and second hubs to rotate relative to each other about the axis of the respective shaft between two end-of-travel positions; and
    elastic elements interposed between said first and second hubs to apply on said first and second hubs a biasing torque tending to urge said first and second hubs towards one of said end-of-travel positions.

2. The transmission of claim 1, wherein said connection elements comprise a plurality of pins which are fixed to the first hub and engage with play in respective slots provided in the second hub.

3. The transmission of claim 2, wherein said elastic elements comprise at least one spring connected at a first end to one of the pins and at an opposite end to said second hub.

4. The transmission of claim 3, wherein said elastic elements comprise a single spring made as a cylindrical helical spring.

* * * * *